INVENTORS
YOZO SASAKI
SADAO ISHIHARA

BY

OSTROLENK, FABER, GERB & SOFFEN
ATTORNEYS

United States Patent Office 3,336,206
Patented Aug. 15, 1967

3,336,206
WATER COLLECTING APPARATUS HAVING A SYNTHETIC RESIN ROOF TREATED WITH AN OXIDIZING AGENT
Yozo Sasaki and Sadao Ishihara, Shiba Mita, Minatoku, Tokyo, Japan, assignors to Nippon Electric Company Limited, Tokyo, Japan
Filed Oct. 17, 1963, Ser. No. 317,020
Claims priority, application Japan, Oct. 24, 1962, 37/47,603
2 Claims. (Cl. 202—234)

The instant invention relates to a water collection apparatus and more particularly to a novel water collection apparatus comprising a synthetic resin as one of its major elements, which resin has been treated in such a manner as to markedly improve its hydrophilic properties.

A water collection apparatus is normally constructed over a ground surface area, which is provided with an airtight housing. Typical apparatus is a box, having an open ended bottom engaging the ground surface and an upper substantially planar surface facing the direction of the sun. The planar surface is comprised of a transparent cover so that sunlight may pass freely therethrough, causing the ground surface confined within the box to be heated by the irradiation of sunlight, and thereby enabling the evaporation of water from the ground surface.

The transparent cover of the housing is only slightly heated by the irradiation of sunlight. In addition thereto, it is cooled with air flowing throughout the outer surface of the housing. In addition to the ground surface enclosed in the housing being easily heated by the irradiation of the sun it is further thermally insulated by the housing. Thus the temperature of the water collection apparatus housing is always lower than that of the ground surface enclosed within the housing, and the temperature of the transparent cover is the lowest of the water collection apparatus.

The water vapor evaporated from the enclosed ground surface by the solar radiation condenses on the low level temperature cover in the form of dew. The water collecting apparatus of this general type has been publicly known. One typical apparatus being described in Japanese patent publication No. 38/6077, entitled A Water Collecting Apparatus, by G. Kobayashi. In that water collecting apparatus the transparent covers are made of glass due to the hydrophilic properties exhibited by clean glass, which cause the condensed water drops which cling to the interior surface of the glass to flow down along the under side of the glass member as long as the glass is installed so as to be inclined at an angle with respect to sea level. This hydrophilic property of glass, along with the fact that it is transparent, makes it advantageous for the collection of water. Due to the above however, it has been found that glass, such as plate glass, has disadvantages for use in such water collection apparatus, in that it is inconvient to handle, since plate glass is easily broken in transportation or in the installation thereof. In addition thereto, plate glass of any substantial size or area is relatively heavy and therefore requires relatively sturdy supporting structures.

The use of synthetic resins, such as vinyl chloride, styrene, or an acrylic resin as the material for use as a transparent cover appears to provide marked advantages. However, while handling and processing of such materials are greatly simplified, use of such materials in water collecting apparatus is not practical. The reason for this is that the surfaces of such a synthetic resin are not hydrophilic, yielding the result that water drops condensed on the surface of such a material is retained upon the inner surface without flowing downward along the inner surface of a cover. This results in the solar radiation being severely scattered, i.e. diffracted and reflected by the water drops condensed under the inner surface of the transparent cover and, the heating of the ground surface is decreased thereby substantially lowering the heating efficiency of the humid. In addition thereto, as the size of water drops increase beyond a threshold limit, the drops fall directly upon the ground contained within the water collecting apparatus such that very little water could be collected thereby.

The instant invention provides an improved type of water collecting apparatus which employs a synthetic resin as a cover means which has been treated in such a manner as to impart to it hydrophilic properties.

The instant invention is comprised of a water collection apparatus having an airtight housing enclosing a ground, or other suitable surface region and having a transparent cover inclined at an angle with reference to sea level. A suitable trough is provided along the lowermost edge of the transparent cover means for the purpose of collecting condensation which forms along the inner surface of the transparent cover, and which runs down along the inner surface so as to be collected by the trough. The transparent cover employed is formed of a synthetic material whose surface is oxidized at a suitable temperature level by means of a selected chemical reagent. As one example, a vinyl chloride cover has been treated by a sulphuric acid solution saturated with potassium dichromate or with chromium trioxide at a temperature between 60° and 90° C. for a predetermined time interval of at least ten minutes. Such treatment has been found to impart sufficient hydrophilic properties to the surface of the resin without having any effect whatsoever upon its transparency. It has been found that as much 1.2 liters of water per one square meter of ground surface can be collected per day with such a water collection apparatus. This amount has been found to be at least four times greater than that obtainable when using untreated vinyl chloride. In addition to the above advantage, vinyl chloride is substantially lighter than plate glass and, is therefore easier to handle both in transportation and installation permitting usage of much lighter weight supporting structures for the water collection apparatus.

It is therefore one object of the instant invention to provide a novel water collection apparatus having a transparent plastic cover means which has been so treated as to enhance its hydrophilic properties.

Another object of the instant invention is to provide a novel water collection apparatus employing transparent cover means formed of vinyl chloride or other suitable synthetic resins.

Still another object of the instant invention is to provide a novel water collection apparatus employing a transparent cover member formed of a synthetic resin which is treated by an oxidation process for the purpose of enhancing its hydrophilic properties.

These and other objects of the instant invention will become apparent when reading the accompanying description and drawings in which.

Figure 1:
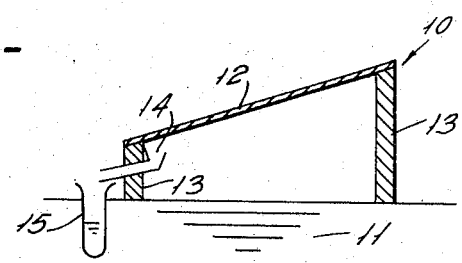
FIGURE 1 shows a water collection apparatus designed in accordance with the principles of the instant invention.

Referring now to the drawings and more particularly to FIGURE 1, which illustrates the principles of operation of a water collection apparatus, there is shown therein a typical installation 10. A ground other surface 11 is covered in a substantially airtight manner with a housing comprised of suitable supporting framework 13, having a transparent cover 12, supported therein. Solar radiation penetrates through the transparent cover 12 of the apparatus 10 so as to heat the ground surface 11. The water vapor produced by the heating action rises so as to make contact with the lower inner surface of the transparent cover 12 which is maintained at a substantially low temperature level, causing the water vapor to be condensed as water drops on the inner surface of the cover. The water drops flow downward due to the incline of the cover means 12 so as to be collected in trough 14 which runs off any water collected into the jar or container 15.

The major feature of the instant invention is that the transparent cover means 12, employed in the installation 10, is formed of a synthetic material exhibiting an advantageous characteristic activity of the cover surface with respect to contacting water.

Several methods have been known for imparting the hydrophilic properties to the surface of a hydrophobic synthetic resin, such as, for example, the electrical discharging process, the Kraft's polymerization method, caused by the irradiation of a radioactive element, and the surface oxidation process using chemical reagents. None of the above methods have been found to provide favorable results for use in the construction of a water collection apparatus since these methods have been developed primarily for the purpose of facilitating dyeing of the surfaces of synthetic resins and not for the purpose of collecting water.

As one example, transparent covers produced by the electrical discharging process forms active points having such hydrophilic properties, but since these points are located only in distinctive areas of the material, failing to cover the entire surface, only a partial flow of water drops results when employing the oxidation method by chemical reagents, it has been found that the transparency of the synthetic resin is markedly affected resulting in a substantial lowering of the efficiency of the apparatus.

It has been found through our experimentation that the hydrophilic surface properties necessary for effective operation of a water collection apparatus can be imparted to a variety of transparent organic resins without any impairment to their transparency qualities. The hydrophilic properties are obtained by subjecting a transparent organic resin to an oxidation process at a suitable temperature level by means of suitably selected chemical reagents. One preferable means of treatment is comprised of selecting hard vinyl chloride as the transparent synthetic resin. The resin is treated in a solution of 98% concentrated sulphuric acid, saturated with potassium dichromate or with chromium trioxide. The temperature during this period is held between 60° and 90° C. for an interval of from ten minutes to one hour. This treatment has been found to impart sufficient hydrophilic properties to the surface of the resin without affecting its transparency.

Hard vinyl chloride that has been subjected to the process above detailed, does not lose its hydrophilic properties even after having been rinsed with water for long periods of time. In cases where the hydrophilic properties of the surface have been severely hampered, due to contamination of the surface by oil or other harmful elements, the advantageous properties can be easily recovered by rinsing the contaminated surface, with a soap solution for example.

It is also possible to treat other transparent resins, such as a styrene resin, or an acrylic resin, having hydrophilic properties by suitably diluting the concentration of the sulphuric acid solution below the 98% level.

Figure 2:
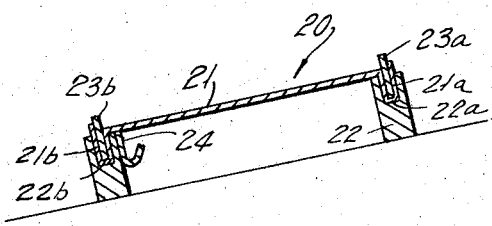
FIGURES 2, 3 and 4 illustrate alternative embodiments to that shown in FIGURE 1.
Figure 3:
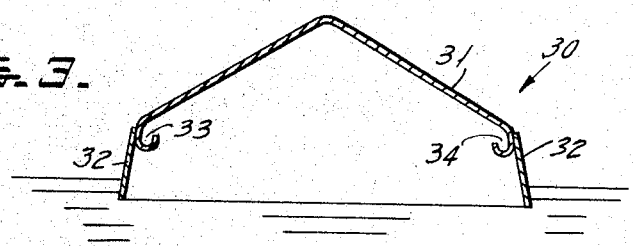
Figure 4:
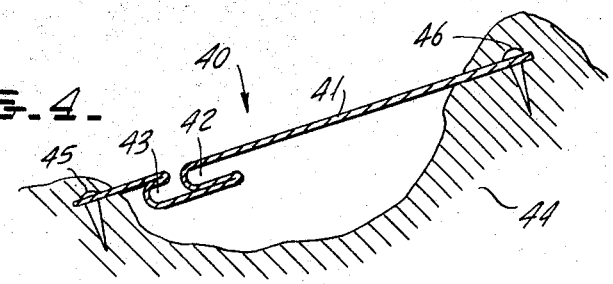

FIGURES 2–4 represent embodiments of the apparatus which incorporate the principles of the instant invention. The first step in providing such water collection apparatus is that of treating the interior surfaces of the transparent resin sheets to obtain the hydrophilic properties desired.

In FIGURE 2, the apparatus 20 is comprised of an activated synthetic resin plate 21, which is secured in the grooves 22a and 22b provided in the frame 22 by means of the wedges 23a and 23b, which rigidly maintain the U-shaped flanges 21a and 21b of the resinous plate 21 within the grooves 22a and 22b. A trough 24 provided along the lower inside surface of resinous plate 21 is formed of the same synthetic resin and is installed in the position shown, so as to be able to collect water drops flowing downwardly and to the left across transparent plate 21, for collection in a suitable bottle or other container (not shown).

FIGURE 3 shows another alternative embodiment 30 having a substantially V-shaped resinous plate 31 to form a roof upon the apparatus framework 32. Troughs 33 and 34 are provided along opposite interior sides of the roof plate member 31 for collection of the water which flows downwardly along the inclined inner surfaces of the V-shaped roof plate 31. The frame 32 may be formed of the same synthetic resin material as the roof plate 31.

Referring to the embodiment 40 of FIGURE 4, a synthetic resin plate 41 is provided, which plate 41 has first and second troughs 42 and 43, respectively. The first trough 42 is provided for the purpose of collecting water which forms on the inner surface of plate 41, while trough 43 is provided for the purpose of collecting drops of dew and rain which run down along the outer surface of plate 41. In the embodiment 40 of FIGURE 4, it can be seen that the ground surface 44 is excavated in the manner shown, with the plate 41 being secured to the ground by means of the stakes 45 and 46. The embodiments illustrated in FIGURES 2 and 4 are suitably adapted for installation on inclined ground surfaces, whereas the embodiment illustrated in FIGURE 3 is suitably adapted for installation on level ground.

Experimentation has shown that when using the water collection apparatus 30 of FIGURE 3, the surface of which was formed of a hard transparent vinyl chloride having a thickness of one millimeter and having been treated to obtain the advantageous hydrophilic properties, it was possible to collect 1.2 liters of water per one square meter of ground surface per day. This amount corresponds to at least four times an amount obtainable if the water collecting apparatus of identical dimensions was used, in which the hard transparent vinyl chloride had not been subjected to the activation process described above. In addition to these advantageous features, the apparatus 30 of FIGURE 3 has a weight of less than one-half the weight of a water collection apparatus employing glass plates. It can therefore be seen that the instant invention provides a water collection apparatus which has the advantages of lighter weight, lower costs, more simplified handling procedures than inherent in previously known water collection devices incorporating glass collection surfaces.

Although there has been described a preferred embodiment of this novel invention, many variations and modifications will now be apparent to those skilled in the art. Therefore, this invention is to be limited, not by the specific disclosure herein, but only by the appending claims.

What is claimed is:
1. In a water collection apparatus comprising
  (a) housing means for enclosing a region;
  (b) roof means supported by said housing means, said roof means being positioned at an angle relative to sea level;
  (c) means for collecting water drops formed on the interior surface of said roof means;
    the improvement comprising said roof means consisting essentially of a transparent sheet material of a vinyl chloride, styrene or acrylic resin, and having an oxidized inner surface formed by treatment with a sulfuric acid solution saturated with potassium dichromate or chromium trioxide.

2. The apparatus as defined in claim 1, wherein said transparent sheet material is constituted of a surface-oxidized vinyl chloride resin.

References Cited

UNITED STATES PATENTS

| | | | |
|---|---|---|---|
| 2,668,134 | 2/1954 | Horton | 156—316 |
| 2,848,389 | 8/1958 | Bjorksten | 202—234 |
| 2,937,066 | 5/1960 | Walles | 117—138.8 |
| 3,006,818 | 10/1961 | Lappala et al. | 202—234 |
| 3,142,581 | 7/1964 | Leland | 117—47 |
| 3,142,582 | 7/1964 | Koretzky et al. | 117—47 |

OTHER REFERENCES

Lof, G., O.G.: Saline Water Conversion, Wash. 1960, pp. 156–165, 1960.

NORMAN YUDKOFF, *Primary Examiner.*

WILBUR L. BASCOMB, JR., *Assistant Examiner.*